United States Patent [19]

Sheehan

[11] Patent Number: 5,221,302
[45] Date of Patent: Jun. 22, 1993

[54] MOBILE SEPARATION UNIT

[76] Inventor: Patrick Sheehan, 14, Bishopswood,, Brackla, Bridgend, Mid Glamorgan, United Kingdom

[21] Appl. No.: 803,527

[22] Filed: Dec. 9, 1991

[30] Foreign Application Priority Data

Mar. 15, 1991 [GB] United Kingdom ............... 9105552

[51] Int. Cl.$^5$ ...................... B01D 45/12; B01D 46/02
[52] U.S. Cl. ........................................ 55/422; 55/334; 55/341.7; 55/356; 55/429
[58] Field of Search ................... 55/341.4, 341.7, 356, 55/422, 428, 429, 334

[56] References Cited

U.S. PATENT DOCUMENTS

| | | | |
|---|---|---|---|
| 1,601,148 | 9/1926 | Ruemelin | 55/422 X |
| 1,698,180 | 1/1929 | White | 55/429 |
| 2,703,733 | 3/1955 | Stueven | 55/422 X |
| 3,608,283 | 9/1971 | Huglo | 55/356 X |
| 3,849,091 | 11/1974 | Peterson | 55/429 X |
| 4,017,281 | 4/1977 | Johnstone | 55/334 |
| 4,121,915 | 10/1978 | Anderson | 55/356 X |
| 4,218,226 | 8/1980 | Boozer | 55/356 X |
| 4,227,893 | 10/1980 | Shaddock | 55/356 X |
| 4,323,377 | 4/1982 | Jolin | 55/422 X |
| 4,336,041 | 6/1982 | Jolin | 55/422 X |
| 4,509,963 | 4/1985 | Jackson | 55/429 X |

FOREIGN PATENT DOCUMENTS

| | | |
|---|---|---|
| 0175193 | 3/1986 | European Pat. Off. . |
| 643656 | 4/1937 | Fed. Rep. of Germany ........ 55/422 |
| 1259128 | 1/1972 | United Kingdom . |
| 1329555 | 9/1973 | United Kingdom . |
| 1579011 | 11/1980 | United Kingdom . |

Primary Examiner—Robert Spitzer
Attorney, Agent, or Firm—Rodman & Rodman

[57] ABSTRACT

The mobile separation unit, for separating particulate solids from a transport gas, has a filtration housing for separating the solids from the transport gas connected to a vacuum pump or air compressor for inducing the flow of transport gas into the housing. The housing is mounted such that it is movable between a stowed position and operating position, the center of gravity of the housing in the stowed position being below its center of gravity in the operating position thereby improving the stability of the unit during transportation.

19 Claims, 2 Drawing Sheets

MOBILE SEPARATION UNIT

BACKGROUND OF THE INVENTION

This invention relates to a mobile separation unit for use in separating particulate solids from a transport gas.

Vacuum separation units used in the vacuum loading industry are typically mounted on heavy goods vehicles within the range of 20 to 32 tons, and are fitted with their own containers or tanks for solids of around 10 to 15 cubic meter capacity. An example of such a vacuum separation unit is disclosed in U.K. Patent Specification 1579011, which discloses a vehicle mounted separation unit and has a storage chamber which pivots to allow the stored particulate solids to slide under the influence of gravity out of the chamber, through a pivoting closure door. The mobile separation unit disclosed has the disadvantages that once the storage chamber is filled, the chamber must be pivoted to enable the contents to be removed therefrom; this necessitates interrupting the separation process whilst the container is tipped. In addition, the operating orientation of the separation chamber is the same as the orientation of the separation chamber during transit, which may consequently lead to instability of the vehicle in transit.

Furthermore, such known vacuum separation units require the particulate solids to be moved to a tipping or holding area once the "on board" container is full. This requires the process of a particulate material extraction to be discontinued whilst the vacuum unit transports its load to a holding area.

The "tipping" action of unloading into an open-topped container may also be disadvantageous where, for example, the particulate material is fine and may be "blown away" during the process; or where, for example, the particulate material may react adversely with atmospheric gases (as is often the case with chemical process catalysts).

It is an object of the present invention to provide an apparatus which alleviates some of the above mentioned difficulties.

SUMMARY OF THE INVENTION

According to the invention, there is provided a mobile separation unit for separating particulate solids from a transport gas, which mobile separation unit comprises:

(a) a walled housing, having inlet means arranged, when said housing is orientated in an operating position, to permit entry of a mixture of said transport gas and particulate solids into the interior of said housing, means for inhibiting flow of said particulate solids out of said housing through said gas outlet means, and discharge means arranged to permit said particulate solids to exit said housing whilst said housing is in said operating position;

(b) means for inducing flow of said transport gas through said inlet means into the interior of said housing, and out of said housing via said gas outlet means; and (c) means for selectively changing the orientation of said housing between a stowed position and said operating position, such that in said operating position said housing is orientated substantially perpendicularly to the orientation of said housing in said stowed position.

In the stowed position, the location of the centre of gravity of the housing is below the location of centre of gravity of the housing in the operating position.

At least the walled housing and the means for selectively changing the orientation of the housing are mountable on transportation means such as a vehicle chassis truck support bed or the like. Advantageously the means for inducing the flow of the transport gas is also mountable on the transportation means.

Once the housing is orientated in the operating position, effectively continuous separation and discharge of the particulate solids may be achieved by the separation unit.

It is preferred that the housing is pivotable between the stowed and operating positions. Advantageously a hydraulically actuable cylinder and ram is provided to induce movement of the housing from the stowed position to the operating position and vice versa. Preferably, an air compressor, vacuum pump, or the like is provided to induce the flow of the transport gas. Advantageously, the air compressor or vacuum pump is demountable from the transportation means for ease of maintenance.

It is preferred that the walled housing is in the form of a hopper or the like, with the discharge outlet means being preferably provided in such a location that it is proximate to the lowermost extent of the hopper when the hopper is in the operating position.

Advantageously the hopper has sloping walls such that in the operating position, the particulate solids deposited in the hopper may slide under gravity through the discharge outlet means. Advantageously, the discharge outlet means is provided with valve means arranged to selectively inhibit the flow of particulate solids therethrough.

Typically, the discharge outlet means is arranged to be sealingly connected to the open top of a receptacle container such as a drum or the like. In this way continuous discharge of the particulate solid material may be achieved by simply replacing the container/drum with a fresh empty container/drum once the first one is full.

It is preferred that the gas outlet means comprise a pair of outlet ducts extending from the housing and communicating with the means for inducing the flow of transport gas.

DETAILED DESCRIPTION OF THE PREFERRED EMBODIMENT

Figure 1:
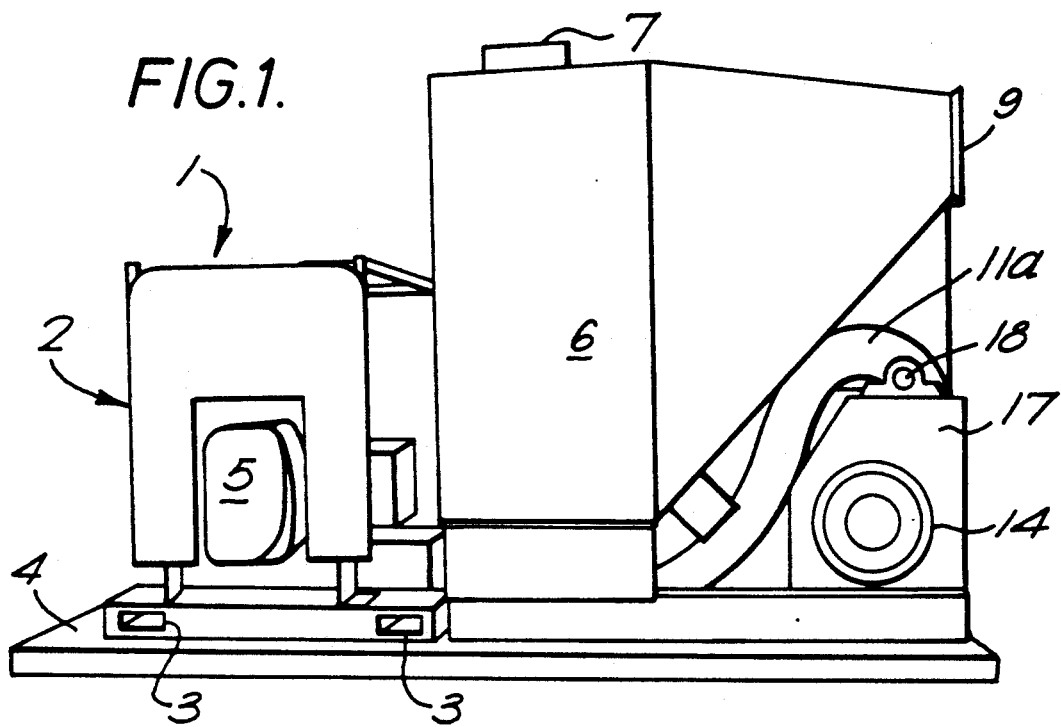
FIG. 1 is a perspective view of a mobile separation unit according to the invention showing the housing orientated in the stowed position.

Referring to the drawings, the mobile separation unit generally designated 1 has a vacuum power pack and hydraulic system reservoir mounted in a containment frame generally designated 2. The containment frame 2 is mounted on the front end of a vehicle support platform 4, and is demountable in its entirety therefrom by means of a forklift truck or the like, because the containment frame 2 is provided with rigid steel bracket openings 3 for receiving the lifting tines of a forklift truck. The demountable nature of the containment frame 2 enables routine maintenance of the vacuum power pack and hydraulic system to be conveniently undertaken at ground level.

The vacuum power pack consists of an air cooled diesel engine 5 coupled through a direct drive to a commercially available "Rootes" type blower (not shown).

Figure 2:
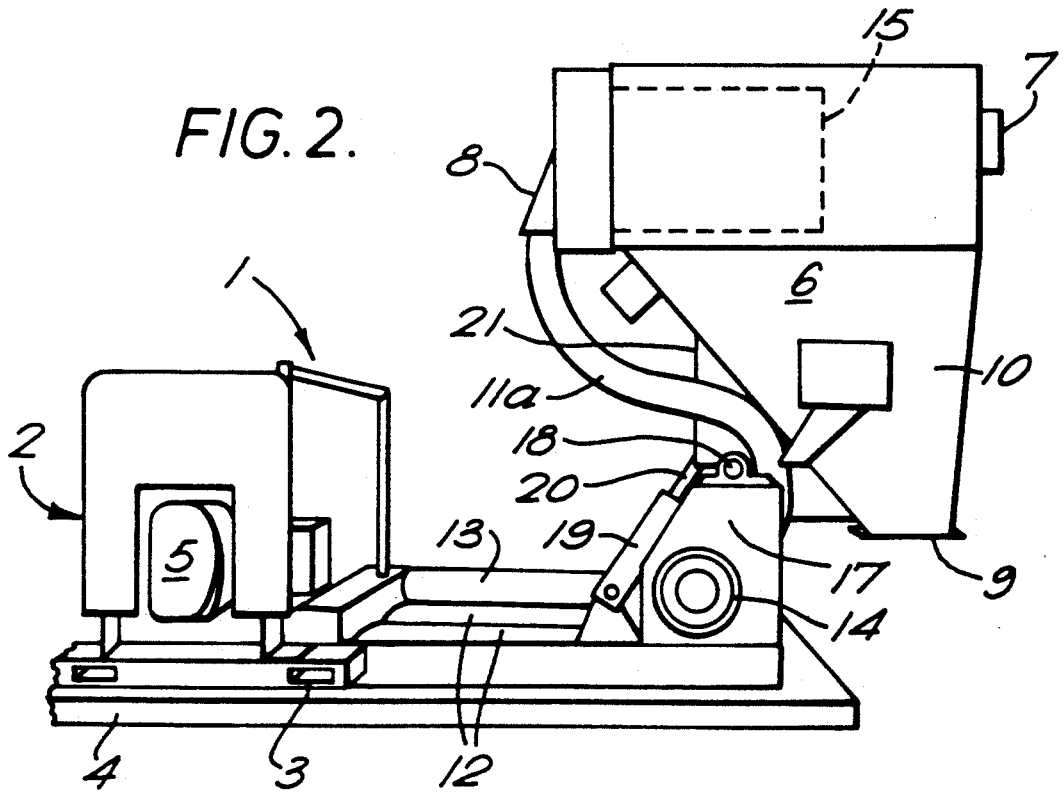
FIG. 2 is a perspective view of the separation unit of FIG. 1 showing the housing in the operating position.
Figure 3:
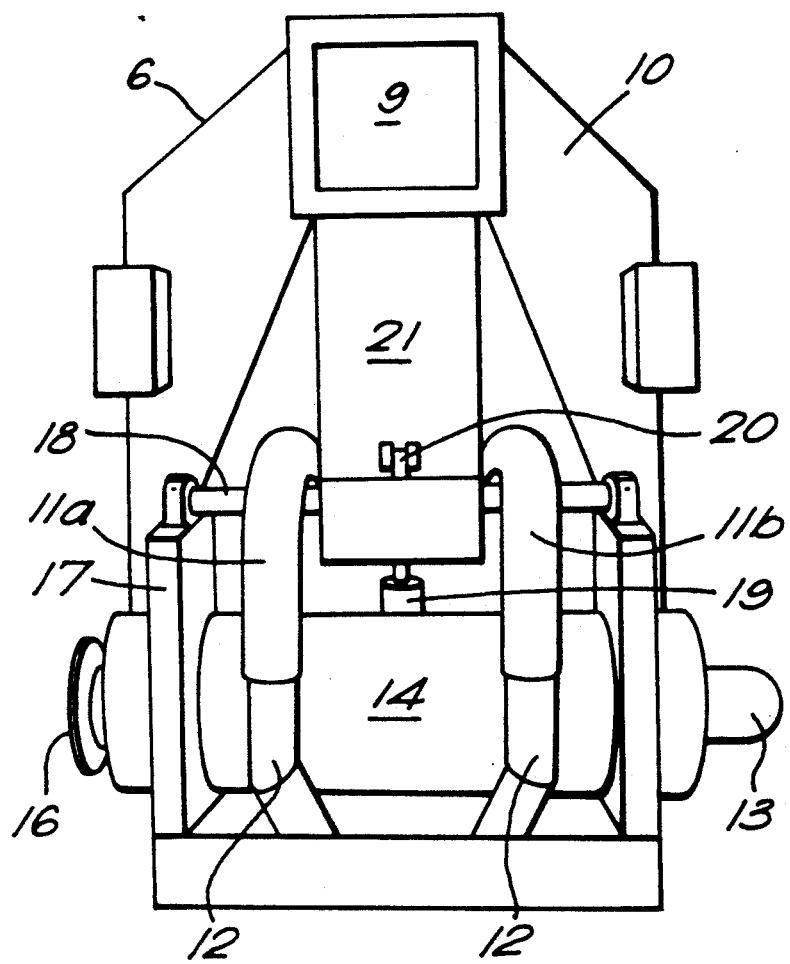
FIG. 3 is an end elevation of a part of the separation unit of FIG. 2.

At the rear of the platform, and as shown most clearly in FIG. 2, there is mounted a hopper container 6. The hopper container is provided with an inlet 7 for air/particulate catalyst mixture, air filtration outlets 8, and outlet 9 for particulate catalyst. Walls 10 of the hopper container slope downwardly towards the outlet 9 such that particulate catalyst material deposited in the hopper container 6 may slide under gravity through the outlet 9. The interior of the hopper container 6 is provided with a filtration unit 15 (shown in dashed lines in FIG. 2). The filtration unit comprises a number of muslin bag filters of known type which surround and prevent particulate catalyst material from passing through the air filtration outlet 8 from the interior of the hopper container 6. Extending from the air filtration outlet 8 are twin flexible vacuum outlet hoses 11a, 11b which lead to respective rigid manifold pipes 12. The manifold pipes 12 extend from the rear of the platform 4 to the low pressure side of the vacuum power pack blower in the containment frame 2 at the front of the platform 4. Leading from the high pressure side of the vacuum pack blower is an exhaust manifold 13 which extends along the length of the platform 4 to connect with an exhaust silencer 14 mounted transversely to the platform 4.

In use, the hopper container is oriented as shown in FIG. 2. An inlet pipe (not shown) is connected at its one end to the inlet 7, and at its other end to a store of spent catalyst in particulate form. When the blower is operated, a mixture of air (the transport gas) and particulate catalyst is drawn along the inlet pipe and passes via the inlet and into the interior of hopper container 6. In the hopper container 6, the air flow is divided, about half passing via the filtration unit 15 into vacuum outlet hose 11a, and the remainder via the filtration unit into vacuum outlet hose 11b. The fabric bag filters which comprise the filtration unit 15 prevent the particulate catalyst material passing into vacuum outlet hoses 11a, 11b, thereby ensuring that the particulate catalyst is instead deposited in the hopper container 6. This particulate catalyst material will then fall, or slide downwards under gravity along the sloping side walls 10 of the hopper container towards the discharge outlet 9. The particulate catalyst may then pass directly into collection bags or containers (not shown) which are sealed to the discharge outlet 9, or be retained in the container hopper 6 when the discharge outlet 9 is sealed by means of a valve plate (not shown).

The filtered air is continually drawn along hoses 11a, 11b where it passes first into respective manifold pipes 12 and then on into the blower loaded in the containment frame 2. The transport air is then expelled from the blower on the high pressure side and exhausts along the exhaust manifold 13 before exiting to the atmosphere via the exhaust silencer 14. Alternatively, return pipework may be fixed to the flange 16 of the silencer 14 and the air directed back to the catalyst store to be re-used as the transport gas. This in effect provides a "closed loop" for the transport gas and enables other "expensive" gases such as an inert gas to be used as the transport gas where necessary (for example, when it is important to avoid reaction of the particulate catalyst with air).

The hopper container 6 is pivotally mounted on a support frame 17 by means of a rotatable support shaft 18. A hydraulically actuated double acting cylinder 19 and ram 20 is operable to pivot the hopper container through 90° from its operating position (shown in FIG. 2) to its stowed position (shown in FIG. 1). The ram 20 is pivotally connected to the wall 21 of the hopper container 6 at a pivot point offset from the axis of the rotatable support shaft 18, such that in the stowed position, the rearmost extremity of the hopper container (which is defined in the stowed position by the discharge outlet 9) does not extend past the rearmost extremity of the support platform 4. In the stowed position the flexible vacuum outlet hoses are wrapped around the exhaust silencer 14.

The pivotal nature of the hopper container 6 on the support frame 17 ensures that the centre of gravity of the separation unit as a whole (and the hopper container 6 in particular) is located closer to the support platform 4 (and nearer the centre thereof) in the stowed position (FIG. 1) than in the operating position (FIG. 2). This increases the stability of the separation unit when in the stowed position for transportation purposes, but enables the hopper to be located at the required orientation (dictated by the height above ground of the discharge outlet 9 for filling containers or bags) during operation.

Coupling of replacement bags/containers to the discharge outlet bags once filling of a first bag/container is full enables separation and discharge of the particulate catalyst material to be achieved, which provides significant advantages over prior art separation units. Typically the support platform 4 is located on the chassis of a small truck or the like, such that when the hopper container 6 is oriented in the stowed position, the truck may simply and safely be driven to its next location of operation.

I claim:

1. A mobile separation unit for separating particulate solids from a transport gas, which mobile separation unit comprises:

(a) a walled housing pivotally mounted on a pivotal axis on a vehicle having an elongate chassis, said housing having inlet means arranged, when said housing is orientated in an operating position, to permit entry of a mixture of said transport gas and particulate solids into the interior of said housing, gas outlet means arranged to permit said transport gas to exit from said housing, means for inhibiting flow of said particulate solids out of said housing through said gas outlet means, and discharge means arranged to simultaneously permit said particulate solids to directly exit said housing whilst said housing is operating in said operating position;

(b) means for inducing flow of said transport gas through said inlet means into the interior of said housing, and out of said housing via said gas outlet means; and (c) means for selectively changing the pivotal orientation of said housing between a stowed position in which said discharge means is positioned above the level of said pivotal axis and said operating position, in which said operating position, said housing is orientated substantially perpendicular to the orientation of said housing in said stowed position, wherein in changing said orientation of said housing between said stowed position and said operating position, said discharge means is caused to move along an arcuate path downwardly and outwardly relative to said vehicle chassis, such that in said operating position, said discharge means is positioned beyond the rearmost longitudinal extent of said chassis and below the level of said discharge means when said housing is orientated in said stowed position.

2. A mobile separation unit according to claim 1, wherein the housing is pivotally movable between the stowed and operating positions.

3. A mobile separation unit according to claim 1, which comprises a hydraulically actuable cylinder and ram arranged to induce movement of the housing from the stowed position to the operating position and vice versa.

4. A mobile separation unit according to claim 1, wherein the walled housing comprises a hopper.

5. A mobile separation unit according to claim 4, wherein the discharge means is provided proximate to the lowermost extent of the hopper when the hopper is in the operating position.

6. A mobile separation unit according to claim 4, wherein the hopper has sloping side walls such that in the operating position, the particulate solids deposited in the hopper may slide under gravity through the discharge means.

7. A mobile separation unit according to claim 1, wherein the discharge means is provided with closure means arranged to selectively inhibit the flow of particulate solids through said discharge means.

8. A mobile separation unit according to claim 1, wherein the discharge means is sealingly connectable to a receptacle or container.

9. A mobile separation unit according to claim 1, wherein the gas outlet means comprise a pair of outlet ducts extending from the walled housing and communicating with the means for inducing the flow of transport gas.

10. A mobile separation unit for separating particulate solids from a transport gas, which mobile separation unit comprises:
   (a) a walled housing pivotally mounted on a pivotal axis on a vehicle having an elongate chassis, said walled housing having inlet means arranged, when said housing is orientated in an operating position, to permit entry of a mixture of said transport gas and particulate solids into the interior of said housing, gas outlet means arranged to permit said transport gas to exit from said housing, means for inhibiting flow of said particulate solids out of said housing through said gas outlet means and discharge means arranged to simultaneously permit said particulate solids to directly exit said housing whilst said housing is in said operating position;
   (b) means for inducing flow of said transport gas through said inlet means into the interior of said housing, and out of said housing via said gas outlet means; and
   (c) means for selectively changing the pivotal orientation of said housing between a stowed position in which said discharge means is positioned above the level of said pivotal axis and said operating position, in which said stowed position the centre of gravity of said housing is positioned closer to the centre of said elongate chassis than the position of the centre of gravity of said housing in said operating position, wherein in changing said orientation of said housing between said stowed position and said operating position, said discharge means is caused to move along an arcuate path downwardly and outwardly relative to said vehicle chassis, such that whilst in said operating position said discharge means is positioned beyond the rearmost longitudinal extent of said chassis and below the level of said discharge means when said housing is orientated in said stowed position.

11. A mobile separation unit according to claim 10, wherein the housing is pivotably movable between the stowed and operating positions.

12. A mobile separation unit according to claim 10, which comprises a hydraulically actuable cylinder and ram arranged to induce movement of the housing from the stowed position to the operating position and vice versa.

13. A mobile separation unit according to claim 10, wherein the walled housing comprises a hopper.

14. A mobile separation unit according to claim 13, wherein the discharge means is provided proximate to the lowermost extent of the hopper when the hopper is in the operating position.

15. A mobile separation unit according to claim 13, wherein the hopper has sloping side walls such that in the operating position, the particulate solids deposited in the hopper may slide under gravity through the discharge means.

16. A mobile separation unit according to claim 10, wherein the discharge means is provided with closure means arranged to selectively inhibit the flow of particulate solids through said discharge means.

17. A mobile separation unit according to claim 10, wherein the discharge means is sealingly connectable to a receptacle or container.

18. A mobile separation unit according to claim 10, wherein the gas outlet means comprise a pair of outlet ducts extending from the walled housing and communicating with the means for inducing the flow of transport gas.

19. A mobile separation unit for separating particulate solids from a transport gas which mobile separation unit comprises,
   (a) an elongated platform having a front end and a rear end,
   (b) a walled housing pivotally mounted on a pivotal axis on said elongated platform, said housing being movable on said platform from a stowed position to an operating position, said housing having inlet means arranged, when said housing is orientated in said operating position, to permit entry of a mixture of said transport gas and particulate solids into the interior of said housing, gas outlet means arranged to permit said transport gas to exit from said housing, means for inhibiting flow of said particulate solids out of said housing through said gas outlet means, and discharge means arranged to simultaneously permit said particulate solids to directly exit said housing while said housing is operated in said operating position,
   (c) means for inducing flow of said transport gas through said inlet means into the interior of said housing, and out of said housing via said gas outlet means, and
   (d) means for selectively changing the pivotal orientation of said housing between said stowed position in which said discharge means is positioned above the level of said pivotal axis wherein said housing does not extend beyond the rear end of said platform, and said operating position wherein said housing is orientated substantially perpendicular to the orientation of said housing in said stowed position wherein in changing said orientation of said housing between said stowed position and said operating position, said discharge means is caused to move along an arcuate path downwardly and outwardly relative to said vehicle chassis, such that in said operating position, said discharge means are positioned beyond the rear end of said platform and below the level of said discharge means when said housing is orientated in said stowed position to permit collection and containment of discharged particulate solids beyond said platform.

* * * * *